United States Patent
Schall et al.

(10) Patent No.: US 11,306,376 B2
(45) Date of Patent: Apr. 19, 2022

(54) WASTEGATE COMPONENT COMPRISING A NOVEL ALLOY

(71) Applicant: BorgWarner Inc., Auburn Hills, MI (US)

(72) Inventors: Gerald Schall, Bobenheim-Roxheim (DE); Melanie Gabel, Bockenheim (DE); Stephan Weniger, Heidelberg (DE)

(73) Assignee: BorgWarner Inc., Auburn Hills, MI (US)

( * ) Notice: Subject to any disclaimer, the term of this patent is extended or adjusted under 35 U.S.C. 154(b) by 373 days.

(21) Appl. No.: 16/063,369

(22) PCT Filed: Dec. 7, 2016

(86) PCT No.: PCT/US2016/065254
§ 371 (c)(1),
(2) Date: Jun. 18, 2018

(87) PCT Pub. No.: WO2017/105942
PCT Pub. Date: Jun. 22, 2017

(65) Prior Publication Data
US 2019/0003020 A1  Jan. 3, 2019

(30) Foreign Application Priority Data
Dec. 18, 2015 (EP) ..................................... 15201335

(51) Int. Cl.
*C22C 30/00* (2006.01)
*C22C 19/05* (2006.01)
(Continued)

(52) U.S. Cl.
CPC ............ *C22C 30/00* (2013.01); *C21D 9/0068* (2013.01); *C22C 19/05* (2013.01); *C22C 19/055* (2013.01); *C22C 19/056* (2013.01); *F02B 37/183* (2013.01)

(58) Field of Classification Search
CPC ....... C22C 30/00; C22C 19/056; C22C 38/48; C22C 38/44; F01L 3/02; F01L 2303/00; C21D 6/02; C21D 9/0068
(Continued)

(56) References Cited

U.S. PATENT DOCUMENTS 5,409,415 A * 4/1995 Kawanami .............. B24C 11/00
                                                         451/39
5,567,383 A    10/1996 Noda et al.
(Continued)

FOREIGN PATENT DOCUMENTS

CN    103422028 A    12/2013
CN    104195474 A    12/2014
(Continued)

OTHER PUBLICATIONS

NPL: on-line translation of EP 1997921 A2, Nov. 2008 (Year: 2008).*
(Continued)

*Primary Examiner* — Jie Yang
(74) *Attorney, Agent, or Firm* — Young Basile Hanlon & MacFarlane, P.C.

(57) ABSTRACT

The present invention relates to a waste gate component for a turbo charger comprising an alloy comprising about 30 to about 42 wt.-% Ni, about 15 to about 28 wt.-% Cr, about 1 to about 5 wt.-% Cr, about 1 to about 4 wt.-% Ti, and at least about 20 wt.-% Fe, and to processes for preparing such a waste gate component.

11 Claims, 2 Drawing Sheets

(51) Int. Cl.
*C21D 9/00* (2006.01)
*F02B 37/18* (2006.01)

(58) Field of Classification Search
USPC .......................................................... 148/410
See application file for complete search history.

(56) References Cited

U.S. PATENT DOCUMENTS

| | | | |
|---|---|---|---|
| 5,660,938 | A | 8/1997 | Sato et al. |
| 5,945,067 | A | 8/1999 | Hibner et al. |
| 2009/0081074 | A1 | 3/2009 | Barbosa et al. |
| 2014/0366530 | A1* | 12/2014 | Murayama ............ F02B 37/183 60/602 |

FOREIGN PATENT DOCUMENTS

| | | | |
|---|---|---|---|
| DE | 102013214464 | A1 | 1/2015 |
| DE | 102014001330 | A1 | 8/2015 |
| EP | 0801140 | A1 | 10/1997 |
| EP | 0901565 | B1 | 12/2000 |
| EP | 1696108 | A1 | 8/2006 |
| EP | 1997921 | A2 * | 12/2008 ............ C22C 38/18 |
| JP | S51110414 | A | 9/1976 |
| JP | H10298682 | A | 11/1998 |
| JP | H11117019 | A | 4/1999 |
| JP | 2014080651 | A | 5/2014 |
| JP | 2014141713 | A | 8/2014 |
| JP | 2014224310 | A | 12/2014 |

OTHER PUBLICATIONS

NPL: on-line translation of JP 2014080651 A, May 2014 (Year: 2014).*

International Search Report and Written Opinion; dated Feb. 2, 2017; for International Application No. PCT/US2016/065254; 12 pages.

Chinese Office Action dated Oct. 23, 2019; Application No. 201680074546.9; Applicant: BorgWarner Inc.; 11 pages.

* cited by examiner

WASTEGATE COMPONENT COMPRISING A NOVEL ALLOY

FIELD OF THE INVENTION

The present invention relates to the field of turbochargers, in particular turbochargers for use in internal combustion engines.

BACKGROUND OF THE INVENTION

Turbochargers are used to increase combustion air throughput and density, thereby increasing power and efficiency of internal combustion engines. The design and function of turbochargers are described in detail in the prior art, for example, U.S. Pat. Nos. 4,705,463, and 5,399,064, the disclosures of which are incorporated herein by reference.

The materials used in the production of turbochargers have to meet stringent performance requirements. For instance, the materials have to be sufficiently corrosion resistant when exposed to exhaust gases at temperatures of up to about 1050° C. Furthermore, the materials have to satisfy mechanical requirements, such as strength, toughness, and tribological requirements at these high temperatures. In particular, in twin scroll turbo charger designs, the high frequency of exhaust gas pressure changes results in high requirements regarding tensile strength, LCF performance, and tribological properties of the waste gate materials.

The nickel-chromium alloy Inconel 713C meets these high requirements and is commercially used for wastegate components. Inconel 713C has the following representative composition: C 0.2 wt.-%, Mn 1.0 wt.-% max, S 0.015 wt.-% max, Si 1.0 wt.-% max, Cr 11.0-14.0 wt.-%, Mo 3.5-5.5 wt.-%, Ti 0.25-1.25 wt.-%, Al 5.5-6.5 wt.-%, Fe 5.0 wt.-% max, Nb and Ta 1.0-3.0 wt.-%, Ni remainder. However, as an alloy with a large amount of nickel, Inconel 713C is relatively expensive.

It would be desirable to replace Inconel 713C with an alloy having a lower proportion of nickel while retaining at least similar performance. In particular, LCF and fretting performance of the wastegate component should be similar.

SUMMARY OF THE INVENTION

The present invention relates to a waste gate component for a turbo charger comprising an alloy comprising about 30 to about 42 wt.-% Ni, about 15 to about 28 wt.-% Cr, about 1 to about 5 wt.-% Cr, about 1 to about 4 wt.-% Ti, and at least about 20 wt.-% Fe, and to processes for preparing such a waste gate component.

In a first aspect, the present invention relates to waste gate component for a turbo charger comprising an alloy of the following composition:
a)

| Ni | about 30 to about 42 wt.-%, |
|---|---| b)

| Cr | about 15 to about 28 wt.-%, |
|---|---| c)

| Co | about 1 to about 5 wt.-%, |
|---|---| d)

| Ti | about 1 to about 4 wt.-%, |
|---|---| e) optionally one or more elements selected from the group consisting of Mo, Al, Mn, W, Si and Nb, in particular one or more of elements in amounts as follows: Mo about 0.5 to about 4 wt.-%, Al about 0.1 to about 2 wt.-%, Mn about 0.1 to about 3 wt.-%, W about 0.1 to about 3 wt.-%, Si about 0.5 to about 4 wt.-%, and Nb about 1 to about 4 wt.-%,
f) optionally other elements in a total amount of less than about 2 wt.-% (impurities),
g) Fe as balance, but at least in an amount of about 20 wt.-%.

In another aspect, the present invention relates to a method for preparing a waste gate component for a turbo charger comprising an alloy of the following composition:
a)

| Ni | about 30 to about 42 wt.-%, |
|---|---| b)

| Cr | about 15 to about 28 wt.-%, |
|---|---| c)

| Co | about 1 to about 5 wt.-%, |
|---|---| d)

| Ti | about 1 to about 4 wt.-%, |
|---|---| e) optionally one or more elements selected from the group consisting of Mo, Al, Mn, W, Si and Nb, in particular one or more of elements in amounts as follows: Mo about 0.5 to about 4 wt.-%, Al about 0.1 to about 2 wt.-%, Mn about 0.1 to about 3 wt.-%, W about 0.1 to about 3 wt.-%, Si about 0.5 to about 4 wt.-%, and Nb about 1 to about 4 wt.-%,
f) optionally other elements in a total amount of less than about 2 wt.-% (impurities),
g) Fe as balance, but at least in an amount of about 20 wt.-%;
wherein the alloy is subjected to solution heat treatment, followed by precipitation hardening, and wherein the precipitation hardening includes the following steps, in that order;
   i. tempering the alloy at about 700 to about 750° C., in particular about 720 to about 730° C.
   ii. tempering the alloy at about 600 to about 640° C., in particular about 615 to about 625° C.

In yet another aspect, the present invention relates to a method of modifying the surface of a waste gate component for a turbo charger comprising an alloy of the following composition;

a)

| Ni | about 30 to about 42 wt.-%, |
|---|---| b)

| Cr | about 15 to about 28 wt.-%, |
|---|---| c)

| Co | about 1 to about 5 wt.-%, |
|---|---| d)

| Ti | about 1 to about 4 wt.-%, |
|---|---| e) optionally one or more elements selected from the group consisting of Mo, Al, Mn, W, Si and Nb, in particular one or more of elements in amounts as follows: Mo about 0.5 to about 4 wt.-%, Al about 0.1 to about 2 wt.-%, Mn about 0.1 to about 3 wt.-%, W about 0.1 to about 3 wt.-%, Si about 0.5 to about 4 wt.-%, and Nb about 1 to about 4 wt.-%, f) optionally other elements in a total amount of less than about 2 wt.-% (impurities), g) Fe as balance, but at least in an amount of about 20 wt.-%;

wherein the surface of a waste gate component is shot peened with a substantially spherical shot material having an average diameter of between about 100 and about 2000 µm.

DETAILED DESCRIPTION OF THE INVENTION

Figure 1:
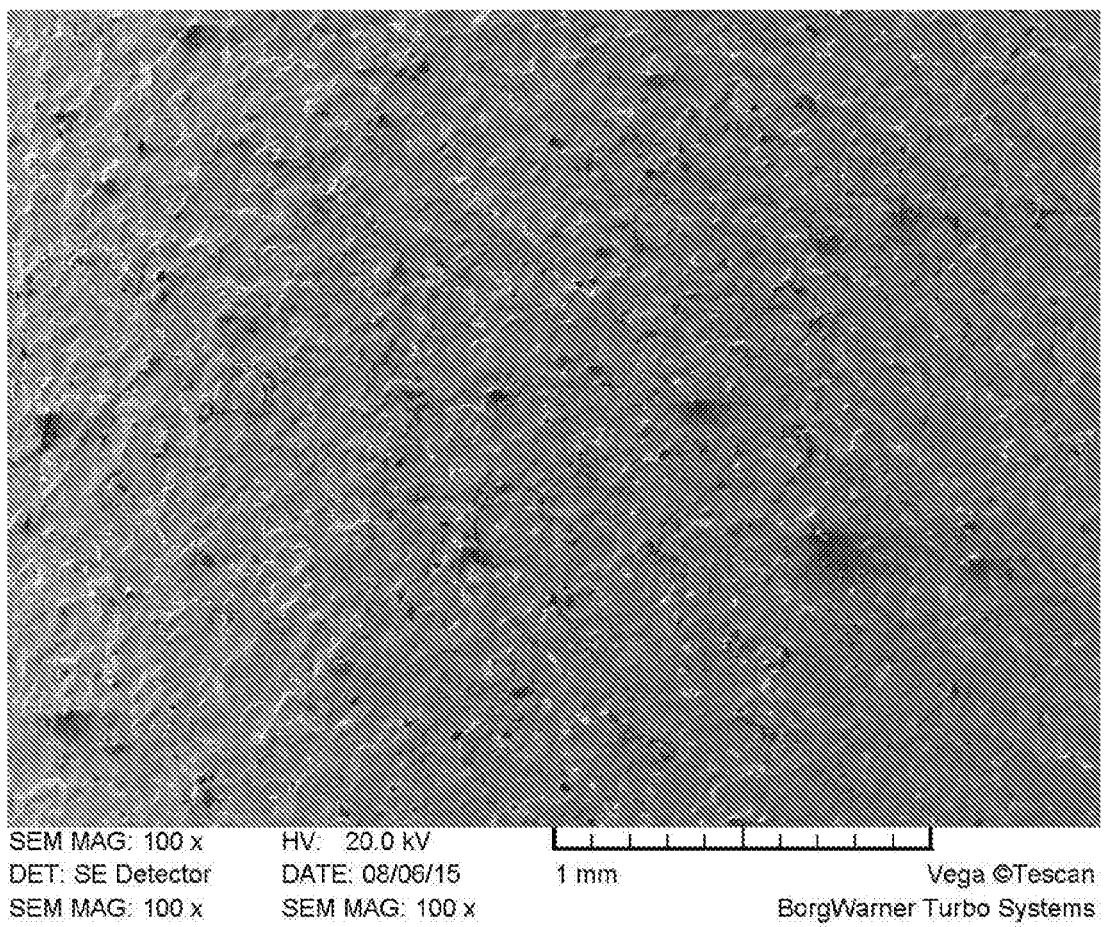
FIG. 1 is a magnification of a wastegate spindle having surface indentations as are obtainable by shot peening the spindle with a substantially spherical shot media having a diameter of about 400 µm. The magnification is 100-fold.

In a first aspect, the present invention relates to a waste gate component for a turbo charger comprising an alloy of the following composition:

a)

| Ni | about 30 to about 42 wt.-%, |
|---|---| b)

| Cr | about 15 to about 28 wt.-%, |
|---|---| c)

| Co | about 1 to about 5 wt.-%, |
|---|---| d)

| Ti | about 1 to about 4 wt.-%, |
|---|---| e) optionally one or more elements selected from the group consisting of Mo, Al, Mn, W, Si and Nb, in particular one or more of elements in amounts as follows: Mo about 0.5 to about 4 wt.-%, Al about 0.1 to about 2 wt.-%, Mn about 0.1 to about 3 wt.-%, W about 0.1 to about 3 wt.-%, Si about 0.5 to about 4 wt.-%, and Nb about 1 to about 4 wt.-%, f) optionally other elements in a total amount of less than about 2 wt.-% (impurities), g) Fe as balance, but at least in an amount of about 20 wt.-%.

The alloy according to the first aspect of the invention comprises about 30 to about 42 wt.-% Ni. Advantageously, the alloy comprises about 32 to about 39 wt.-%, in particular about 34 to about 38 wt.-%, Ni. The alloy further comprises about 15 to about 28 wt.-% Cr. Advantageously, the alloy comprises about 17 to about 26 wt.-%, in particular about 19 to about 24 wt.-%, Cr. The alloy further comprises about 1 to about 5 wt.-% Co. Advantageously, the alloy comprises about 1 to about 5 wt.-%, in particular about 1.5 to about 4.5 wt.-%, Co. The alloy further comprises about 1 to about 5 wt.-% Ti. Advantageously, the alloy comprises about 1.5 to about 3.5 wt.-%, in particular about 2.0 to about 3.0 wt.-%, Ti. Alloys of this type were found to provide a balanced mix of mechanical, tribological, and corrosion-resistance properties required for the use as a waste gate component for a turbo charger. In addition, due to the high iron and low nickel content in comparison to Inconel 713C, the alloy is relatively inexpensive.

The alloy may optionally contain one or more further elements to adjust its properties. In particular, the alloy may optionally comprise one or more elements selected from the group consisting of Mo, Al, Mn, W Si and Nb. Advantageously, the said elements may be used in the following amounts:

Mo about 0.5 to about 4 wt.-%, in particular about 1.0 to about 3.0 wt.-%,

Al about 0.1 to about 2 wt.-%, in particular about 0.3 to about 0.8

Mn about 0.1 to about 3 wt.-%, in particular about 0.5 to about 2.5 wt.-%,

W about 0.1 to about 3 wt.-%, in particular about 0.5 to about 2.5 wt.-%,

Si about 0.5 to about 4 wt.-%, in particular about 0.6 to about 2.4 wt.-%, and

Nb about 1 to about 4 wt.-%, in particular about 1.7 to about 2.5 wt.-%.

Besides Mo, Al, Mn, W, Si and Nb, the alloy may also contain other elements in minor amounts which add up to a total amount of less than about 2 wt.-%. These other elements will typically be impurities introduced from raw materials or during the preparation of the alloy. However, other elements purposefully added in minor amounts to fine-tune alloy properties are also intended to be included in this definition as long as their total amount, together with the total amount of impurities, is less than about 2 wt.-%. Examples of elements which may be added in minor amounts to fine-tune alloy properties include lanthanoids, boron or zirconium. These elements in combination with the impurities advantageously add up to a total amount of less than about 1.5 wt.-%, more specifically less than about 1 wt.-%, and in particular less than about 0.5 wt.-%.

The alloy may comprise Nb in an amount of about 1 to about 4 wt.-%, in particular about 1.7 to about 2.5 wt.-%, and/or W in an amount of about 0.1 to about 3 wt.-%, in particular about 0.5 to about 2.5 wt.-%, and/or Mo in an amount of about 0.5 to about 4 wt.-%, in particular about 1.0 to about 3.0 wt.-%, and C in an amount of less than about 0.1 wt.-%, in particular in amounts of about 0.02 to about 0.09 wt.-%. Without wishing to be bound by theory, Nb, Mo, and W are thought to compete with Cr in the carbide formation. Besides providing their own potential benefits such as improving strength, wear and hot gas corrosion resistance to the alloy, the addition of Nb, Mo, and/or W is therefore believed to reduce chromium carbide formation. In combination with a relatively low amount of carbon in the alloy, the addition of Nb, Mo, and/or W may free up Cr on the alloy surface which then may form chromium oxides when exposed to hot exhaust gasses. Chromium oxide top coats may, in turn, reduce sliding abrasion and improve oxidation resistance.

Advantageously, the alloy comprises between about 1 and about 10 wt.-% of one or more elements selected from Mn, Al, and Si. More specifically, the alloy may contain Nb in an amount of about 1 to about 4 wt.-%, in particular about 1.7 to about 2.5 wt.-%, Mo in an amount of about 0.5 to about 4 wt.-%, in particular about 1.0 to about 3.0 wt.-%, W in an amount of about 0.1 to about 3 wt.-%, in particular about 0.5 to about 2.5 wt.-%, and C in an amount of less than about 0.1 wt.-%, in particular in an amount of about 0.02 to about 0.09 wt.-%. In particular, the alley may comprise Nb in an amount of about 1.7 to about 2.5 wt.-%, Mo in an amount of about 1.0 to about 3.0 wt.-%, W in an amount of about 0.5 to about 2.5 wt.-%, and C in an amount of about 0.02 to about 0.09 wt-%.

The alloy may also comprise between about 0.5 and about 10 wt.-% of one or more elements selected from Mn, Al, and Si Advantageously, the alloy comprises Mn in an amount of about 0.1 to about 3 wt.-%, in particular about 0.5 to about 2.5 wt.-%, and/or Al in an amount of about 0.1 to about 2 wt.-%, in particular about 0.3 to about 0.8 wt.-%, and/or Si in an amount of about 0.5 to about 4 wt.-%, in particular about 0.6 to about 2.4 wt.-%, provided that the total amount of these elements add up to about 0.5 and about 10 wt.-%. In particular, the alloy may comprise Mn in an amount of about 0.5 to about 2.5 wt.-%, Al in an amount of about 0.3 to about 0.8 wt.-%, and Si in an amount of about 0.6 to about 2.4 wt.-%. Without wishing to be bound by theory, Mn, Al, and Si are thought to act as deoxidizing elements and may contribute to high temperature strength and toughness. In addition, Al and Si further increase resistance to scaling and, thus, may improve high temperature corrosion resistance and resistance to wear.

The relatively high amount of chromium in the alloys of the invention already provides oxidation and corrosion resistance. The addition of Al and Si may be used to further adjust high temperature oxidation and corrosion resistance. In this context, the invention in particular also relates to a waste gate component for a turbo charger comprising an alloy of the following composition:

a)

| Ni | about 30 to about 42 wt.-%, |
|---|---| b)

| Cr | about 15 to about 28 wt.-%, |
|---|---| c)

| Co | about 1 to about 5 wt.-%, |
|---|---| d)

| Ti | about 1 to about 4 wt.-%, |
|---|---| e) optionally one or more elements selected from the group consisting of Mo, Mn, W, and Nb, in particular one or more of elements in amounts as follows: Mo about 0.5 to about 4 wt.-%, Mn about 0.1 to about 3 wt.-%, W about 0.1 to about 3 wt.-%, and Nb about 1 to about 4 wt.-%, f) Al and/or Si in an amount of about 0.5 to about 10 wt.-%, g) optionally other elements in a total amount of less than about 2 wt.-% (impurities), h) Fe as balance, but at least in an amount of about 20 wt.-%, wherein the alloy has a loss in thickness of surface material of less than about 50 μm after exposure to diesel exhaust gas with about 4 wt.-% added water for a time period of about 360 hours at a temperature of about 920° C.

The alloy may comprise about 0.5 to about 4 wt.-% Mo, about 0.1 to about 2 wt.-% Al, about 0.1 to about 3 wt.-% Mn, about 0.1 to about 3 wt.-% W, about 0.5 to about 4 wt.-% Si, about 1 to about 4 wt.-% Nb, and less than about 0.1 wt.-% C. The alloy may also comprise about 1.0 to about 3.0 wt.-% Mo, about 0.3 to about 0.8 wt.-% Al, about 0.5 to about 2.5 wt.-% Mn, about 0.5 to about 2.5 wt.-% W, about 0.6 to about 2.4 wt.-% Si, about 1.7 to about 2.5 wt.-% Nb, and about 0.02 to about 0.09 wt.-% C.

Advantageously, the alloy comprises about 34 to about 38 wt.-% Ni, about 19 to about 24 wt.-% Cr, about 1.5 to about 4.5 wt.-% Co, about 2.0 to about 3.0 wt.-% Ti, about 1.0 to about 3.0 wt.-% Mo, about 0.3 to about 0.8 wt.-% Al, about 0.5 to about 2.5 wt.-% Mn, about 0.5 to about 2.5 wt.-% W, about 0.6 to about 2.4 wt.-% Si, about 1.7 to about 2.5 wt.-% Nb, and about 0.02 to about 0.09 wt.-% C.

From a purity standpoint, all of the above-described alloys advantageously contain less than about 0.1 wt.-% C, less than about 0.05 wt.-% P, less than about 0.05 wt.-% S, and/or less than about 0.04 wt.-% N.

The alloy according to the invention may have good mechanical, chemical, and tribological properties, in particular at high temperatures. The alloy may be endowed with excellent Vickers hardness, ultimate tensile strength, elongation, ultimate elongation, yield strength, creep rate, salt water corrosions resistance, and oxidation stability. In particular, the waste gate components prepared from the alloy may have similar fatigue resistance as like components prepared from Inconel 713C. The fatigue resistance may e.g. be tested by the fatigue resistance test in accordance with VB101 and/or VB102 of the Fraunhofer Institut für Betriebsfestigkeit and Systemzuverlässigkeit LBF, Darmstadt, Germany, at temperatures of about 950° C.

The alloy may further have an austenitic microstructure comprising second phase particles or aggregates of said second phase particles, wherein said particles have an average size of less than about 5 μm, in particular less than about 2 μm. In this context, the average size refers to the average size as measured/determined on the surface of the alloy or as measured/determined on a cutting plane substantially parallel to the surface of the alloy. The average grain size may e.g. be determined by using automatic image analysis according to e.g. ASTM E1245 (2008).

The alloy for the waste gate component of the invention may be subjected to solution heat treatment, precipitation hardening, or both. In particular, the treatment described below was found to be useful for preparing the waste gate components of the invention:

In a second aspect, the present invention relates to a method for preparing a waste gate component for a turbo charger comprising an alloy of the following composition:

a)

| | |
|---|---|
| Ni | about 30 to about 42 wt.-%, | b)

| | |
|---|---|
| Cr | about 15 to about 28 wt.-%, | c)

| | |
|---|---|
| Co | about 1 to about 5 wt.-%, | d)

| | |
|---|---|
| Ti | about 1 to about 4 wt.-%, | e) optionally one or more elements selected from the group consisting of Mo, Al, Mn, W, Si and Nb, in particular one or more of elements in amounts as follows: Mo about 0.5 to about 4 wt.-%, Al about 0.1 to about 2 wt.-%, Mn about 0.1 to about 3 wt.-%, W about 0.1 to about 3 wt.-%, Si about 0.5 to about 4 wt.-%, and Nb about 1 to about 4 wt.-%,
f) optionally other elements in a total amount of less than about 2 wt.-% (impurities),
g) Fe as balance, but at least in an amount of about 20 wt.-%;
wherein the alloy is subjected to solution heat treatment, followed by precipitation hardening, and wherein the precipitation hardening includes the following steps, in that order:
 i. tempering the alloy at about 700 to about 750° C., in particular about 720 to about 730° C.,
 ii. tempering the alloy at about 600 to about 640° C., in particular about 615 to about 625° C.

The alloy to be treated according to the above method may be any alloy disclosed in the first aspect of the invention.

The precipitation hardening according to the above method is advantageously performed for at least about 4 hours, in particular about 6 to about 12 hours, more specifically about 7 to about 9 hours, at about 700 to about 750° C., in particular about 720 to about 730° C., followed by tempering the alloy for at least about 4 hours, in particular about 6 to about 12 hours, more specifically about 7 to about 9 hours, at about 600 to about 640° C., in particular about 615 to about 625° C. These indications of temperature and time may refer to the surface temperature of the tempered alloy workpiece or, in case of very large workpieces where there may exist a temperature gradient between the surface and the core during periods of temperature adjustment, optionally to the temperature of the core or any other location that takes longest to respond to the temperature adjustment.

The solution heat treatment in the above method is performed at a temperature and for a duration that ensures a substantially homogeneous distribution of the alloying elements in the alloy. Suitable conditions may include heating the alloy to above about 950° C. for at least about 1 hour, in particular heating the alloy to about 980 to about 1050° C. for about 3 or more hours.

Between the above-described steps of solution heat treatment and precipitation hardening, the alloy may further be subjected to recrystallization annealing. Recrystallization annealing may be performed for at least about 4 hours, in particular about 6 to about 12 hours, at temperatures of about 830 to about 890° C., in particular about 840 to about 880° C.

The alloy obtainable by the above described methods of the second aspect of the invention may be characterized by an austenitic microstructure comprising fine second phase particles and improved mechanical properties, in particular improved tensile strength. In particular, the above-described methods provide waste gate components comprising an alloy having the following composition:

a)

| | |
|---|---|
| Ni | about 30 to about 42 wt.-%, | b)

| | |
|---|---|
| Cr | about 15 to about 28 wt.-%, | c)

| | |
|---|---|
| Co | about 1 to about 5 wt.-%, | d)

| | |
|---|---|
| Ti | about 1 to about 4 wt.-%, | e) optionally one or more elements selected from the group consisting of Mo, Al, Mn, W, Si and Nb, in particular one or more of elements in amounts as follows: Mo about 0.5 to about 4 wt.-%, about Al 0.1 to about 2 wt.-%, Mn about 0.1 to about 3 wt.-%, W about 0.1 to about 3 wt.-%, Si about 0.5 to about 4 wt.-%, and Nb about 1 to about 4 wt.-%,
f) optionally other elements in a total amount of less than about 2 wt.-% (impurities),
g) Fe as balance, but at least in an amount of about 20 wt.-%,
wherein the alloy has a tensile strength according to e.g. ISO 6892.1 and/or ISO 6892-2 at about 25° C. of at least about 950 MPa, in particular about 1000 to about 1200 MPa; and at least about 450 MPa, in particular about 460 MPa to about 620 MPa, at about 900° C.

In a third aspect, the present invention relates to a method of modifying the surface of a waste gate component for a turbo charger comprising an alloy of the following composition:

a)

| Ni | about 30 to about 42 wt.-%, |
|---|---| b)

| Cr | about 15 to about 28 wt.-%, |
|---|---| c)

| Co | about 1 to about 5 wt.-%, |
|---|---| d)

| Ti | about 1 to about 4 wt.-%, |
|---|---| e) optionally about 0.5 to about 4 wt.-% Mo, about 0.1 to about 2 wt-% Al, about OA to about 3 wt.-% Mn, about 0.1 to about 3 wt.-% W, about 0.5 to about 4 wt.-% Si, about 1 to about 4 wt.-% Nb, f) optionally other elements in a total amount of less than about 2 wt.-% (impurities), g) Fe as balance, but at least in an amount of about 20 wt.-%;

wherein at least part of the surface of a waste gate component is shot peened with a substantially spherical shot material having an average diameter of between about 100 and about 2000 µm.

The alloy to be treated according to the above method may be any alloy disclosed in the first aspect of the invention.

Figure 2:
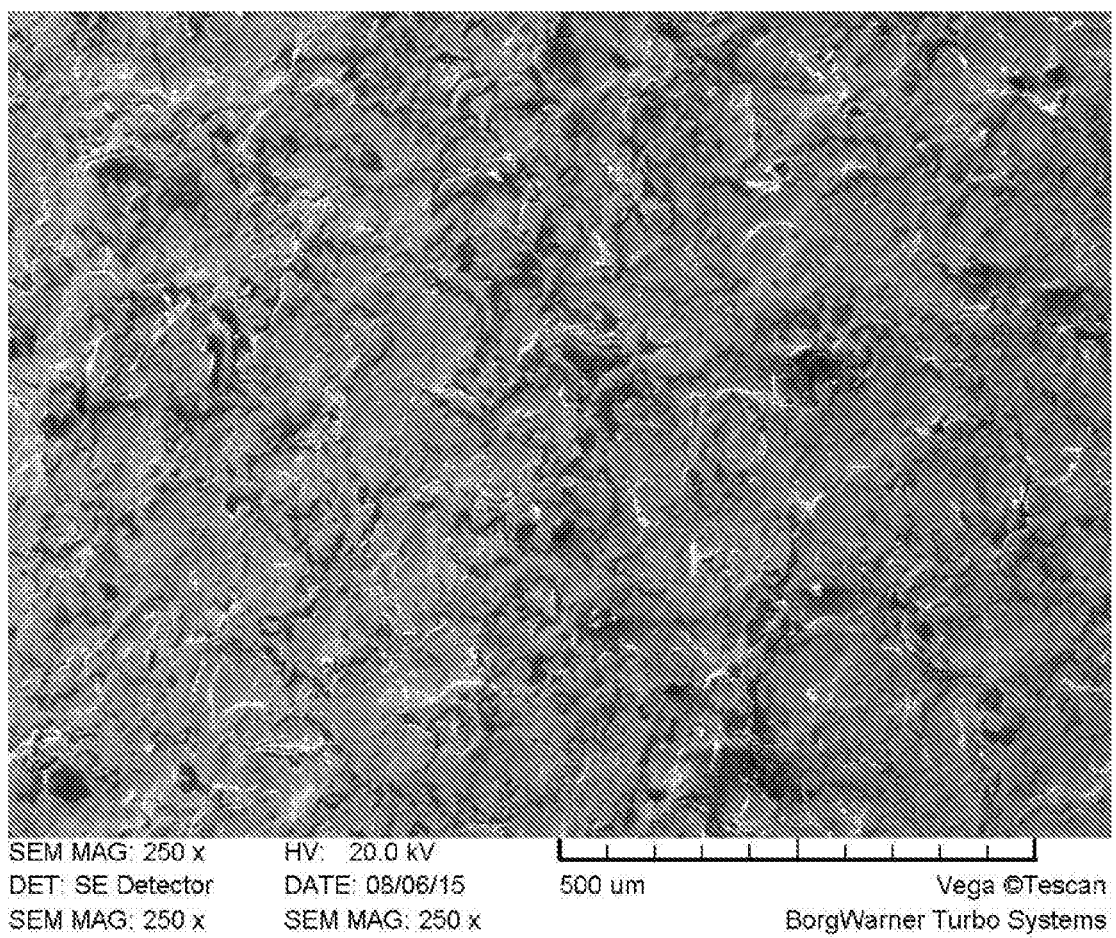
FIG. 2 is a further magnification of a wastegate spindle shown in FIG. 1. The magnification is 250-fold.

The method according to the third aspect of the invention modifies the surface of the waste gate component by producing a plurality of surface indentations on the surface of the waste gate component. Examples of such surface indentations are shown in FIGS. 1 and 2. These surface indentations may have an average depth of about 20 to about 70 µm, in particular about 25 to about 55 µm. The average depth of the surface indentations may e.g. be determined by calculating the average depth on basis of about 100 neighbouring indentations. The depth of individual indentations may be determined by optical, spectroscopic or other means. The surface indentations may be characterized by a surface roughness, measured according to DIN EN ISO 4287 and/or 4288, as defined by an Rz-value of less than about 25 µm, in particular less than about 15 µm, more specifically less than about 10 µm, or between about 2 and about 25 µm, more specifically between about 5 and about 15 about 15 µm. The Ra-value may be between about 1 and about 5 µm, in particular between about 2 and about 4 µm.

It was found that the plurality of surface indentations may improve the tribological performance of the waste gate component. Since the waste gate components of the turbocharger move or rotate in response to control inputs, an improvement in the tribological performance of its components also reduces the hysteresis of controlling the waste gate. Therefore, a waste gate component wherein at least part of the surface of a waste gate component is shot peened as described above may also have improved control quality. Advantageously, the shot peened waste gate component comprises in particular the spindle.

In the context of improving the improvement in the tribological performance by shot peening, it may in particular be advantageous to use an alloy of the first aspect of the invention which comprises Nb in an amount of about 1 to about 4 wt.-%, in particular about 1.7 to about 2.5 wt.-%, and/or W in an amount of about 0.1 to about 3 wt.-%, in particular about 0.5 to about 2.5 wt.-%, and/or Mo in an amount of about 0.5 to about 4 wt.-%, in particular about 1.0 to about 3.0 wt.-%, and C in an amount of less than about 0.1 wt.-%, in particular in amounts of about 0.02 to about 0.09 wt.-%. As explained above, it is believed that the addition of Nb, Mo, and/or W may free up Cr on the alloy surface which then may form chromium oxides which may, in turn, reduce sliding abrasion and improve oxidation resistance. Reducing sliding abrasion may further improve control quality. Improving oxidation resistance may help in maintaining the surface quality of the wastegate component for a longer period of time and, thus, may further improve long-term control quality.

In the context of improving the tribological performance by shot peening, it may also be advantageous to use an alloy of the first aspect of the invention which comprises between about 0.6 and about 6 wt.-% of one or more elements selected from Al and Si. Advantageously, the alloy comprises Al in an amount of about 0.1 to about 2 wt.-%, in particular about 0.3 to about 0.8 wt.-%, and/or Si in an amount of about 0.5 to about 4 wt.-%, in particular about 0.6 to about 2.4 wt.-%. As explained above, it is believed that the addition of Si and/or Al may improve high temperature corrosion resistance and resistance to wear and, thus, may further improve short- and long-term control quality.

The shot peening step according to the above method is advantageously performed with a substantially spherical shot material. Such substantially spherical shot media are commercially available, for instance as conditioned steel cut wire shot. Steel cut wire shot is prepared by cutting steel wire into cylindrical grains so that the respective length of the grain is substantially the same as the diameter of the wire. By rounding the cylinder edges, a conditioned grain is created, classified in the grain shapes G1 (rounded edges), G2-(almost spherical grain) and G3 (spherical grain). A substantially spherical shot material is a G2 and G3-type material. Advantageously, the substantially spherical shot material is a G3 conditioned steel cut wire shot material. However, other shot materials may also be suitable, for instance substantially spherical mineralic shot media such as glass or ceramic pearl media. Advantageously, the substantially spherical shot material is selected from the group consisting of conditioned steel cut wire shot, glass pearls, ceramic pearls, copper shot, and brass shot. The substantially spherical shot material is in particular selected from conditioned steel cut wire shot, fineshot, glass pearls and ceramic pearls.

The substantially spherical shot material is suitable to deform the surface of the waste gate component and may be harder than said surface. The Vickers hardness of the shot peening material may be from about 450 to about 850 HV, in particular from about 670 to about 730 HV. The average diameter of the substantially spherical shot material may be between about 100 µm and about 2000 µm, more specifically between about 200 and about 800 µm, in particular about 300 to about 600 µm.

Advantageously, the substantially spherical shot material is a conditioned steel cut wire shot media having a Vickers hardness between about 670 to about 730 HV and an average diameter between about 200 and about 800 μm, in particular about 300 to about 600 μm.

A waste gate component according to the invention may be shot peened as follows: The waste gate component such as a waste gate spindle is shot peened with an air blast system (e.g. a blast cabinet STD 1400 PS from Rosier Oberflächentechnik GmbH, Germany) using a conditioned steel cut wire shot media having a Vickers hardness between about 670 to about 730 HV and an average diameter between about 400 μm, using a blasting gun having one air nozzle of about 10 mm diameter and a pressure of about 2 bars. The distance between the workpiece and the nozzle is about 80 mm and the nozzle is angled at about 45°. The workpiece is rotated at about 48 rpm and the nozzle is moved 4 times over the workpiece at a speed of about 10 mm/sec.

The shot-peened surface of the waste gate component may optionally be subjected to one or more further shot peenings. A further shot peening may smoothen the edges of the indentation obtained by the first shot peening. The one or more further shot peenings may be performed using the same, a harder or a softer peening material, the same or a smaller or a larger sized material, or any combination thereof. Advantageously, the waste gate component is subjected to at least one further shot peenings using a softer and/or smaller peening material than the 1$^{st}$ peening material. For instance, in case that the first shot peening material is a conditioned steel cut wire shot media having a Vickers hardness between about 670 to about 730 HV and an average diameter of between about 300 and about 800 μm, the second shot peening material may be glass pearls having a Moh hardness of about 5 or about 6, in particular about 6, and an average diameter of between about 20 and about 20 μm, or a fineshot media having a particle size of about 20 to 200 μm, in particular about 50 to about 150 μm.

For instance, the second shot peening may be performed as follows: The waste gate component shot-peened as described above is shot peened for a second time with an air blast system (e.g. a blast cabinet STD 1400 PS from Rösler Oberflächentechnik GmbH, Germany) using glass perals having a Bob hardness of about 5 or about 6 and an average diameter of between about 150 μm and about 250 μm or fineshot having an average diameter of between about 50 and about 150 μm using a blasting gun having one air nozzle of about 10 mm diameter and a pressure of about 2 bars. The distance between the workpiece and the nozzle is about 80 mm and the nozzle is angled at about 45°. The workpiece is rotated at about 48 rpm and the nozzle is moved 4 times over the workpiece at a speed of about 10 mm/sec.

The method according to the third aspect of the invention provides a waste gate component comprising an alloy having the following composition:

a)

| Ni | about 30 to about 42 wt.-%, |
|---|---| b)

| Cr | about 15 to about 28 wt.-%, |
|---|---| c)

| Co | about 1 to about 5 wt.-%, |
|---|---| d)

| Ti | about 1 to about 4 wt.-%, |
|---|---| e) optionally one or more elements selected from the group consisting of Mo, Al, Mn, W, Si and Nb, in particular one or more of elements in amounts as follows: Mo about 0.5 to about 4 wt.-%, about Al 0.1 to about 2 wt.-%, Mn about 0.1 to about 3 wt.-%, W about 0.1 to about 3 wt.-%, Si about 0.5 to about 4 wt.-%, and Nb about 1 to about 4 wt.-%, f) optionally other elements in a total amount of less than about 2 wt.-% (impurities), g) Fe as balance, but at least in an amount of about 20 wt.-%, wherein at least part of the surface of the waste gate component has a plurality of indentations. In particular, these surface indentations may have an average depth of about 20 to about 70 μm, in particular about 25 to about 55 μm. The surface indentations may be characterized by a surface roughness, measured according to DIN EN ISO 4287 and/or 4288, as defined by an Rz-value of less than about 25 μm, in particular less than about 15 μm, more specifically less than about 10 μm, or between about 2 and about 25 μm, more specifically between about 5 and about 15 about 15 μm. The Ra-value may be between about 1 and about 5 μm, in particular between about 2 and about 4 μm.

The above wastegate components may be further characterized as indicated for the waste gate components according to the first aspect of the invention. More specifically, it may be advantageous to combine the 1$^{st}$, 2$^{nd}$, and 3$^{rd}$ aspect of the invention to jointly improve the performance of the wastegate component. In particular, the invention relates to a waste gate component comprising an alloy having the following composition:

a)

| Ni | about 30 to about 42 wt.-%, |
|---|---| b)

| Cr | about 15 to about 28 wt.-%, |
|---|---| c)

| Co | about 1 to about 5 wt.-%, |
|---|---| d)

| Ti | about 1 to about 4 wt.-%, |
|---|---| e) optionally one or more elements selected from the group consisting of Mo, Al, Mn, W, Si and Nb, in particular one or more of elements in amounts as follows: Mo about 0.5 to about 4 wt.-%, about Al 0.1 to about 2 wt.-%, Mn about 0.1 to about 3 wt.-%, W about 0.1 to about 3 wt.-%, Si about 0.5 to about 4 wt.-%, and Nb about 1 to about 4 wt.-%, f) optionally other elements in a total amount of less than about 2 wt.-% (impurities), g) Fe as balance, but at least in an amount of about 20 wt.-%, wherein the alloy has a tensile strength according to e.g. ISO 6892-1 and/or ISO 6892-2 at about 25° C. of at least about 950 MPa, in particular about 1000 to about 1200 MPa; and at least about 450 MPa, in particular about 460 MPa to about 620 MPa, at about 900° C., and wherein at least part of the surface of the wastegate component has a plurality of indentations. In particular, these surface indentations may have an average depth of about 20 to about 70 μm, in particular about 25 to about 55 μm. The surface indentations may be characterized by a surface roughness, measured according to DIN EN ISO 4287 and/or 4288, as defined by an Rz-value of less than about 25 μm, in particular less than about 15 μm, more specifically less than about 10 μm, or between about 2 and about 25 μm, more specifically between about 5 and about 15 about 15 μm. The Ra-value may be between about 1 and about 5 μm, in particular between about 2 and about 4 μm.

It may be further advantageous that the alloy of said wastegate component comprises Nb in an amount of about 1 to about 4 wt.-%, in particular about 1.7 to about 2.5 wt.-%, and/or W in an amount of about 0.1 to about 3 wt.-%, in particular about 0.5 to about 2.5 wt.-%, and/or Mo in an amount of about 0.5 to about 4 wt.-%, in particular about 1.0 to about 3.0 wt.-%, and C in an amount of less than about 0.1 wt.-%, in particular in amounts of about 0.02 to about 0.09 wt.-%.

It may be further advantageous that the alloy of said wastegate component comprises between about 0.6 and about 6 wt.-% of one or more elements selected from Al and Si. Advantageously, the alloy comprises Al in an amount of about 0.1 to about 2 wt.-%, in particular about 0.3 to about 0.8 wt.-%, and/or Si in an amount of about 0.5 to about 4 wt.-%, in particular about 0.6 to about 2.4 wt.-%.

Finally, it may be further advantageous that the alloy of said wastegate component comprises Nb in an amount of about 1 to about 4 wt.-%, in particular about 1.7 to about 2.5 wt.-%, Mo in an amount of about 0.5 to about 4 wt.-%, in particular about 1.0 to about 3.0 wt.-%, W in an amount of about 0.1 to about 3 wt.-%, in particular about 0.5 to about 2.5 wt.-%, and C in an amount of loss than about 0.1 wt.-%, in particular in an amount of about 0.02 to about 0.09 wt.-%. In particular, the alloy may comprise Nb in an amount of about 1.7 to about 2.5 wt.-%, Mo in an amount of about 1.0 to about 3.0 wt.-%, W in an amount of about 0.5 to about 2.5 wt.-%, and C in an amount of about 0.02 to about 0.09 wt.-%.

The above-discussed shot peening method of the third aspect is also applicable to other alloys. Thus, there is also generally provided a method of modifying the surface of a waste gate component for a turbo charger wherein at least part of the surface of a waste gate component is shot peened with a substantially spherical shot material having an average diameter of between about 100 and about 2000 μm. The shot peening process may be further characterized as described for the third aspect of the invention.

The alloys mentioned in this patent application can be prepared by routine methods well-known in metallurgy.

Still further embodiments are within the scope of the following claims.

The invention claimed is:

1. A waste gate component for a turbo charger comprising an alloy of the following composition:

a)

| | |
|---|---|
| Ni | 30 to 42 wt.-%, | b)

| | |
|---|---|
| Cr | 15 to 28 wt.-%, | c)

| | |
|---|---|
| Co | 1 to 5 wt.-%, | d)

| | |
|---|---|
| Ti | 1 to 4 wt.-%, |

Fe as balance, but at least in an amount of 20 wt.-%; and wherein the alloy extends to a surface of the component and has an austenitic microstructure and comprises second phase particles or aggregates of said second phase particles, wherein said particles have an average grain size of less than 5 μm, wherein at least part of the surface of the component is preparable by shot peening the surface with a substantially spherical shot material having a diameter of between 100 and 200 μm.

2. The waste gate component according to claim 1, wherein the alloy comprises at least one of Nb in an amount of 1 to 4 wt.-%, W in an amount of 0.1 to 3 wt.-%, Mo in an amount of 0.5 to 4 and C in the alloy is less than 0.1 wt.-%.

3. The waste gate component according to claim 1, wherein the alloy comprises between 1 and 10 wt.-% of at least one of Mn, Al, or Si.

4. The waste gate component according to claim 3, wherein the alloy comprises 0.5-4 wt.-% Mo, 0.1 to 2 wt.-% Al, and 0.1 to 3 wt.-% W.

5. The waste gate component according to claim 1, wherein the alloy comprises 0.5-4 wt.-% Mo, 0.1 to 2 wt.-% Al, 0.1 to 3 wt.-% Mn, 0.1 to 3 wt.-% W, 0.5 to 4 wt.-% Si, and 1 to 4 wt.-% Nb.

6. The waste gate component according to claim 1, wherein the alloy comprises
a) Ni 34 to 38 wt.-%,
b) Cr 19 to 24 wt.-%,
c) Co 1.5 to 4.5 wt.-%,
d) Ti 2.0 to 3.0 wt.-%.

7. The waste gate component according to claim 1, wherein the alloy comprises 1.0 to 3.0 wt.-% Mo, 0.3 to 0.8 wt.-% Al, 0.5 to 2.5 wt.-% Mn, 0.5 to 2.5 wt.-% W, 0.6 to 2.4 wt.-% Si, and 1.7 to 2.5 wt.-% Nb.

8. The waste gate component according to claim 1, wherein the alloy comprises less than 0.1 wt.-% C, less than 0.05 wt.-% P, less than 0.05 wt.-% S, and less than 300 ppm, by weight, of N.

9. The waste gate component according to claim 1, wherein the alloy has been subjected to solution heat treatment, precipitation hardening, or both.

10. The waste gate component according to claim 1, wherein at least a part of the surface of the component has a plurality of indentations.

11. The waste gate component according to claim 1, wherein the component is a flap plate or a spindle.

* * * * *

UNITED STATES PATENT AND TRADEMARK OFFICE
CERTIFICATE OF CORRECTION

PATENT NO. : 11,306,376 B2
APPLICATION NO. : 16/063369
DATED : April 19, 2022
INVENTOR(S) : Gerald Schall, Melanie Gabel and Stephan Weniger It is certified that error appears in the above-identified patent and that said Letters Patent is hereby corrected as shown below:

In the Specification

In Column 5, Line 32, should read:
"0.09 wt.-%. In particular, the alloy may comprise Nb in an"

In Column 8, Line 64, should read:
"ISO 6892-2 and/or ISO 6892-2 at about 25° C. of at least"

In Column 9, Line 27, should read:
"about 2 wt-% A1, about 0.1 to about 3 wt.-% Mn, about"

In Column 11, Line 40, should read:
"having a Boh hardness of about 5 or about 6 and an average"

In Column 14, Line 34, should read:
"of 1 to 4 wt.-%, W in an amount of 0.1 to 3 wt.-%, Mo in an"

Signed and Sealed this
Seventh Day of June, 2022

Katherine Kelly Vidal
*Director of the United States Patent and Trademark Office*